(12) United States Patent
Jao et al.

(10) Patent No.: US 6,508,896 B1
(45) Date of Patent: Jan. 21, 2003

(54) METHOD AND APPARATUS FOR CALIBRATING AND OPTIMIZING EQUIPMENT FOR PRODUCT FABRICATION

(75) Inventors: Shyh-Hua Eric Jao, Stow, OH (US); Larry Leon Toops, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 237 days.

(21) Appl. No.: 09/634,377

(22) Filed: Aug. 9, 2000

(51) Int. Cl.[7] .................. B23B 31/00; G01M 19/00; G01N 3/62
(52) U.S. Cl. .............. 156/64; 73/805; 73/813; 73/818; 73/865.9; 73/862.046; 700/204; 700/301
(58) Field of Search .................. 156/64; 73/37, 73/865.9, 866, 805, 808, 807, 806, 813, 818, 788, 763, 767, 774, 862.046; 700/204, 301; 702/105

(56) References Cited

U.S. PATENT DOCUMENTS 3,776,029 A * 12/1973 McKee ................. 73/806
4,914,602 A * 4/1990 Abe et al. ............. 73/788 X

FOREIGN PATENT DOCUMENTS

DE          4104975     *  8/1992     ......... B32B/31/00

* cited by examiner

Primary Examiner—Thomas P. Noland
(74) Attorney, Agent, or Firm—David E Wheeler; Richard B O'Planick

(57) ABSTRACT

By measuring the pressure distribution between fabricating equipment and a product formed in that equipment, and optionally the sequence in which the pressure is applied, the quality of product formation may be optimized. In an illustrated embodiment, pressure sensors are placed between a turn-up bladder and a tire apex in tire building equipment, and the pressure applied by the equipment, and the sequence of pressure application are observed and are correlated with product quality.

8 Claims, 4 Drawing Sheets

| 0.3 PSI | 4.9 PSI | 9.4 PSI | 14.0 PSI |

METHOD AND APPARATUS FOR CALIBRATING AND OPTIMIZING EQUIPMENT FOR PRODUCT FABRICATION

FIELD OF THE INVENTION

The invention relates to a method and apparatus for calibrating fabricating equipment that is used to make composite articles, laminates and similar products.

BACKGROUND OF THE INVENTION

In the manufacture of tires, occasionally newly-manufactured tires have to be scrapped due to blows, i.e., small regions of trapped air within the structure of the tire that expand at the high temperatures of curing and cause bubbles in the rubber of the tire. Depending on the particular irregularity in the building process, blows can occur in the bead of the tire, the apex of the tire, the sidewall of the tire, or at the edge of the tread. Such blows may be detectable on the surface of the completed green tire, or the completed cured tire.

When a tire is cured, air that may be trapped in the rubber of the tire is vented, and it is believed that some blows occur when more than normal amounts of air are trapped in one location, and the rubber cures around the trapped air faster than the air can escape.

Pressure sensitive paper previously has been used to determine the pressure between the carcass ply and an apex on a building drum during carcass ply turn-up. Such pressure sensitive paper has a limited gray scale, and there is no way to determine the maximum pressure exerted. It is difficult to distinguish between pressure areas, and the sequence of the different pressure applications in different areas cannot be determined.

Tekscan Inc. is the manufacturer of a sensor mat that has been used by The Goodyear Tire & Rubber Company to obtain a pressure profile in tire footprints. In the conception of the present invention, the inventors speculated that such sensors can be used to obtain specific pressure profiles in tire building applications.

It is an object of the present invention to provide a method and apparatus for minimizing or preventing the trapping of air, or to at least help provide equal distribution of such air in the fabrication of a composite.

Other objects of the invention will be apparent from the following description and claims.

SUMMARY OF THE INVENTION

The invention relates to a method of calibrating pressure distribution applied at a component interface of a composite product by equipment used to fabricate the product, the method comprising the steps of (a) inserting a sensor mat adapted to detect pressure at a plurality of X, Y points between fabricating equipment and the composite; (b) taking a pressure reading and analyzing the pressure at each point of contact between the equipment and the composite; (c) adjusting the equipment to apply different pressures to the composite, if necessary; (d) repeating steps (a) and (b) to determine the pressure distribution change caused by adjusting the equipment, if necessary; and (e) repeating steps (c) and (d) until optimum pressure parameters are achieved.

The method may comprise the further step of measuring pressure distribution as a function of time.

The optimization of the method may include the further step of determining the pressure sufficient to press air from the composite, or at least distribute air in the composite so that it can be vented during curing of the composite.

In the illustrated embodiment of the method, wherein the method is used in the fabrication of a tire, step (a) comprises the further step of using a sensor mat between a turn-up bladder and tire components on a tire building machine, and step (b) comprises the further step of collecting data from the sensor in real time on a computer using a program whereby the pressure change can be viewed frame by frame in a time sequence.

More specifically, the method of fabricating a composite product comprises the steps of (a) laying up layered components of a composite; (b) calibrating fabricating equipment by (i) inserting a sensor mat adapted to detect pressure at a plurality of X, Y points between fabricating equipment and the composite; (ii) taking a pressure reading and analyzing the pressure at each point of contact between the equipment and the composite; (iii) adjusting the equipment to apply different pressures to the composite, if necessary; (iv) repeating steps (i) and (ii) to determine the pressure distribution change caused by adjusting the equipment, if necessary; (v) repeating steps ((iii) and (iv) until optimum pressure parameters are achieved, and (b) applying a pressure or pressure sequence to the layered components using the fabricating equipment wherein the pressure or pressure sequence is determined by calibration of the fabricating equipment.

Also provided is a pressure sensor mat for acquiring data on a circular or cylindrical interface, the sensor mat comprising a plurality of legs which converge into a handle portion wherein the legs contain pressure sensors, and wherein the handle is a conduit for connectors between the pressure sensors and a data recording device.

The legs may be provided with a trapezoidal shape, and sensors in the legs may have the same density in their length and width directions. The legs may have a length sufficient to use different legs to obtain measurements on both sides of a component simultaneously.

DETAILED DESCRIPTION OF THE INVENTION

The method of the present invention can be used for the construction of any composite article wherein the application of pressure during the laying up of the components of the article is important. For ease of description, the invention is illustrated with reference to a tire building process wherein the pressure between the turn-up of the carcass ply and the apex component, or between the apex component and the carcass ply of the tire is measured. Those skilled in the art will recognize that the method may be used in general with other components of the tire, as well as with laminations and other composite constructions and fabrications.

Figure 1:
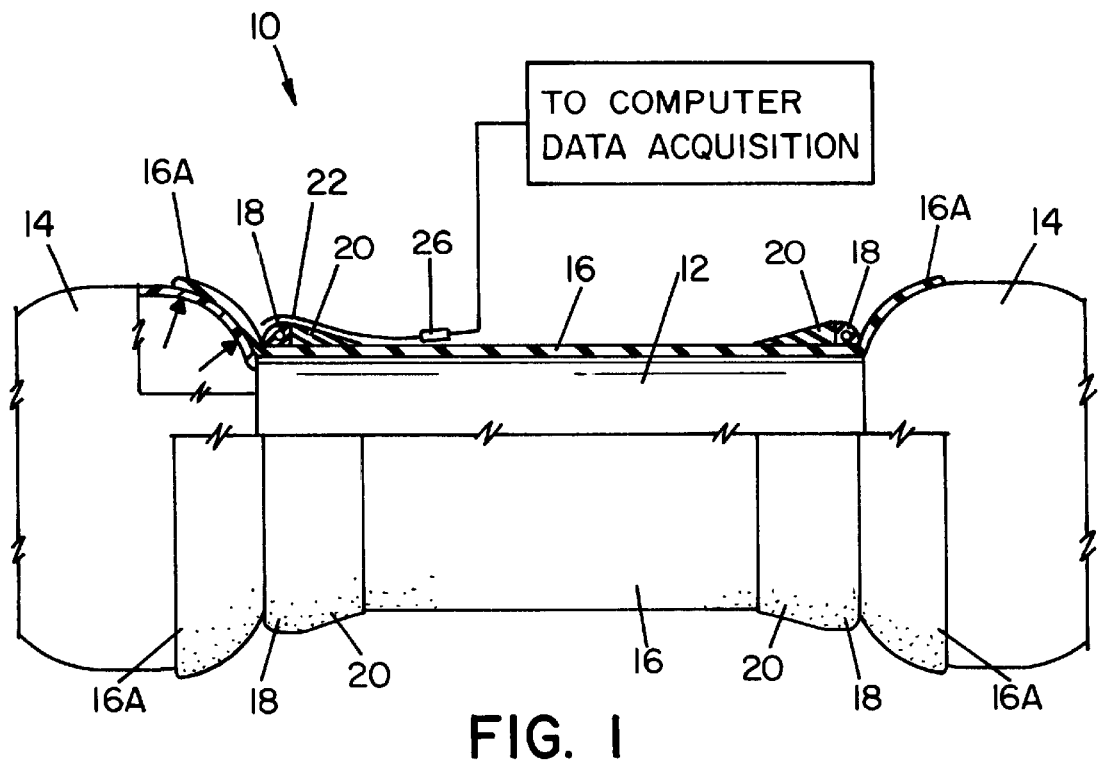
FIG. 1 illustrates a tire building drum which employs turn-up bladders to provide the carcass turn-up, i.e., the turn-up of the ends of the carcass over the apex, during the tire building process.

With reference now to FIG. 1, the apparatus (10) used for building a tire comprises a building drum (12) and turn-up bladders (14) disposed at each end of building drum (12). In the construction of a tire, the tire components are laid up on drum (12). In the illustrated embodiment, carcass ply (16) is applied to the drum wherein the edges (16A) of the carcass ply extend beyond the length of the drum. After application of carcass ply (16) to drum (12), a bead (18) is applied over carcass ply (16) at each end of the drum. Apex (20) is applied in the proximity of the bead (18), and over carcass ply (16). In the construction of a tire, turn-up bladder (14) is inflated, independently or simultaneously with the inflation of carcass ply (16), and the turn-up bladder is collapsed over the end of the drum toward the center of the carcass ply. In either case, the turn-up bladder forces the ends (16A) of the carcass ply over the beads (18) and the apex (20) as is illustrated in FIG. 2.

Figure 2:
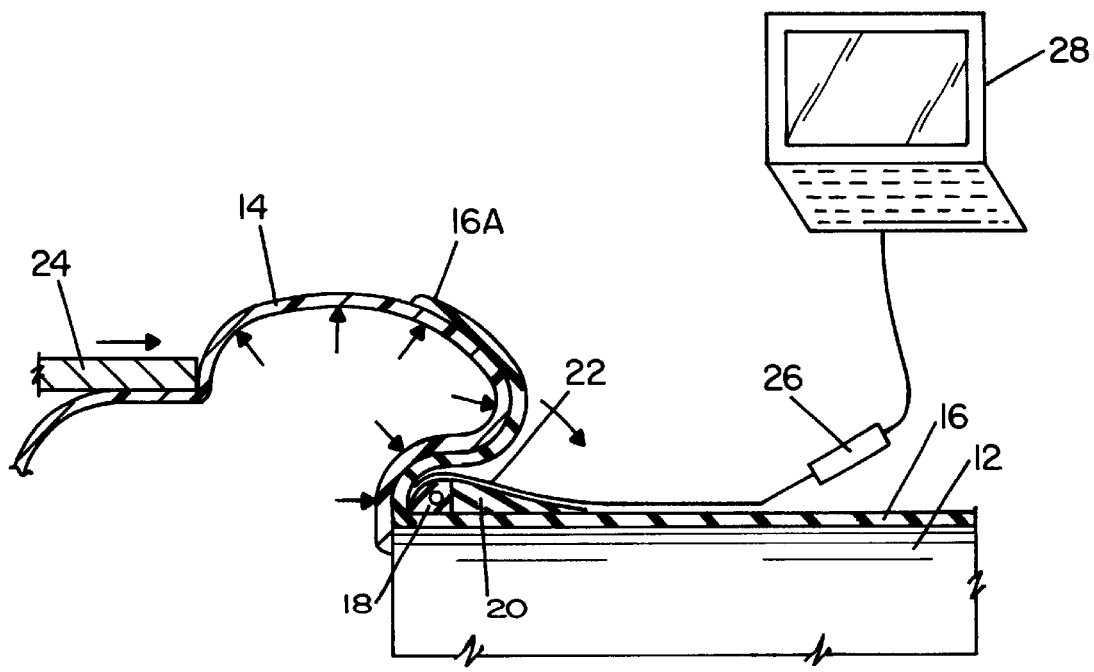
FIG. 2 illustrates activation of the turn-up bladder during tire construction wherein the sensor mat is disposed between the turn-up bladder and the tire apex.

In FIGS. 1 and 2, the sensor (22) is illustrated as being applied between the carcass turn-up (16A) and the apex (20). In some tire building apparati, a push can (24) is used to help direct the turn-up bladder over the apex and bead.

Figure 6:
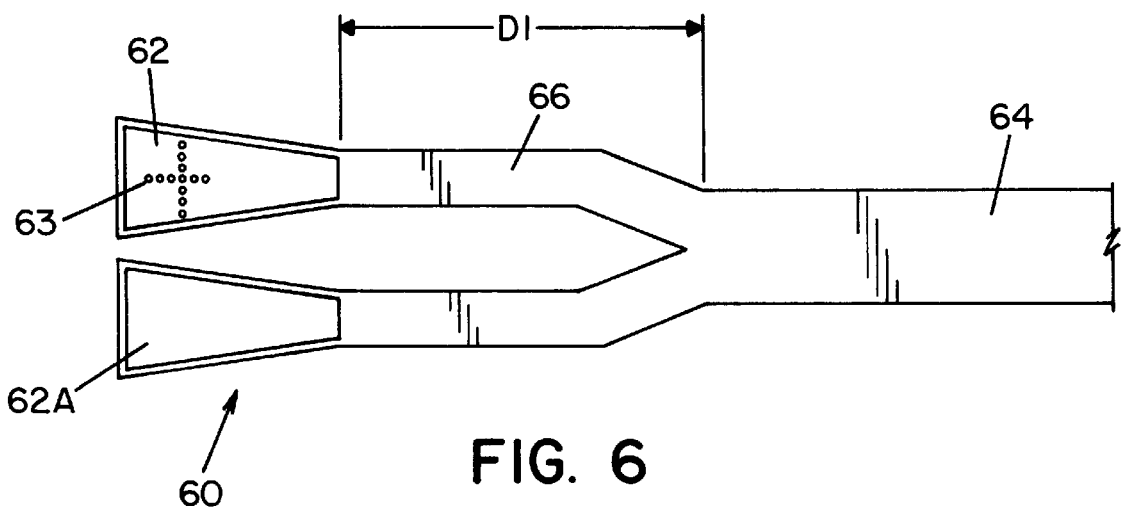
FIG. 6 illustrates a pressure sensor which can be used to determine the pressures around the bead area of a tire during tire construction.

With reference also to FIG. 6, the sensors (22) are connected by conductors within handle (26) of the sensor mat which is used to obtain the measurements, and the handle is connected to a data acquisition device. In the illustrated embodiment, a personal computer (28) is used as a data acquisition device whereby the data can be captured and displayed, frame by frame, in the sequence that the data is acquired.

Accordingly, the transient contact pressure history at the green tire component interface during the ply turn-up can be obtained. Also, similar data can be obtained during the stitching of the tire on the building drum.

The sensor mat digitizes the contact pressure output between the two surfaces which contact the sensor mat during the turn-up. The computer system is capable of recording pressure distribution frame by frame, continuously within a specified time interval, and the display of the pressure data can be played back in slow motion, or in real time, for review.

Figure 3:
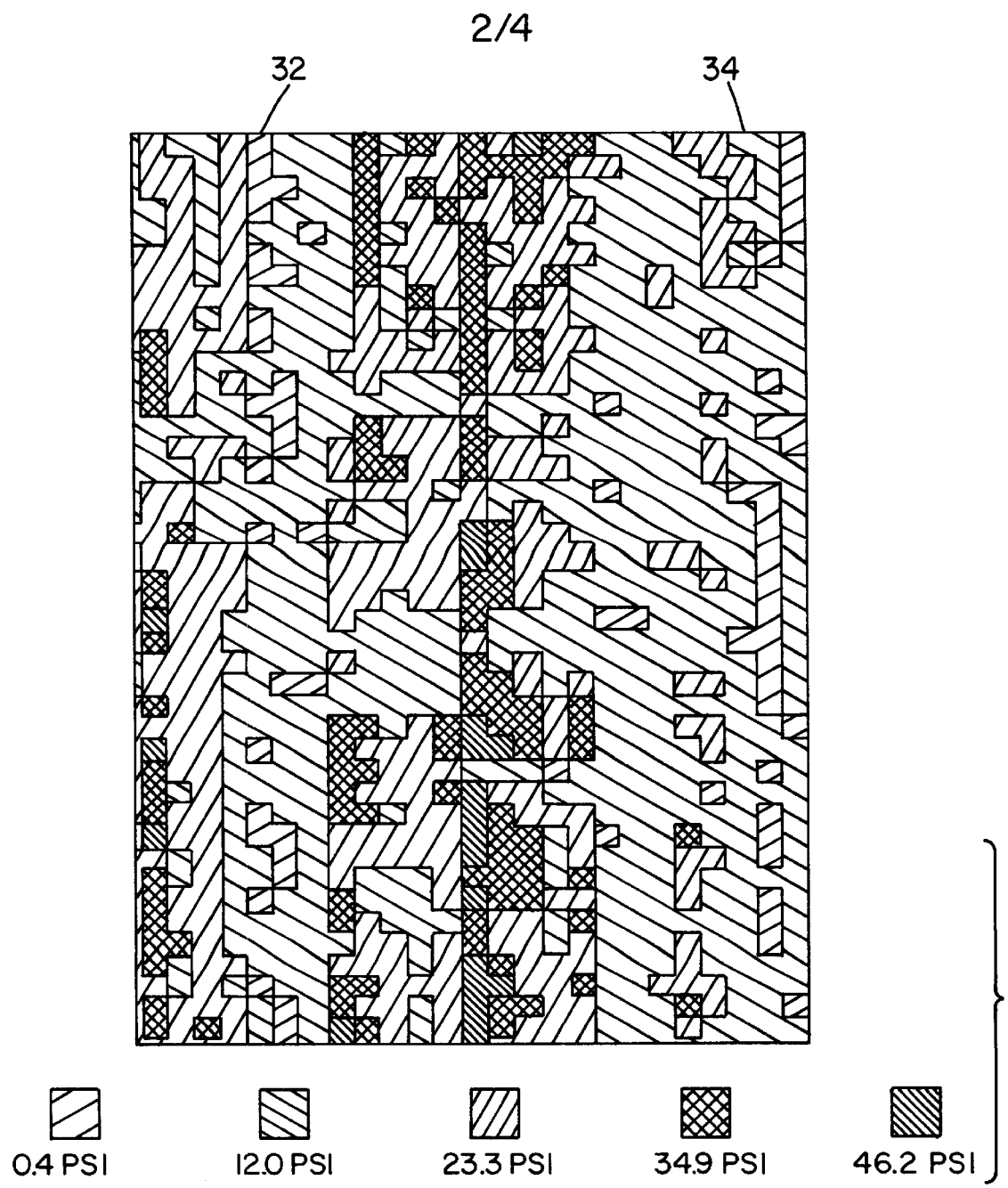
FIG. 3 illustrates a representation of the pressure distribution across the bead and over the turn-up end of the carcass in a tire construction.

With reference now to FIG. 3, the pressure distribution obtained during a carcass ply turn-up using a square sensor mat is illustrated wherein it has been shown that the pressure at the component endings, i.e. at area (32) corresponding to the edges of the apex and area (34) corresponding to the edge of the turn-up, is lower than the pressures seen at other areas of the component segments.

It has been observed that these low-pressure areas (32,34) are some of the primary locations for blows, and the lower pressure is an indication that there is a potential in these areas for the accumulation of trapped air.

Figure 4:
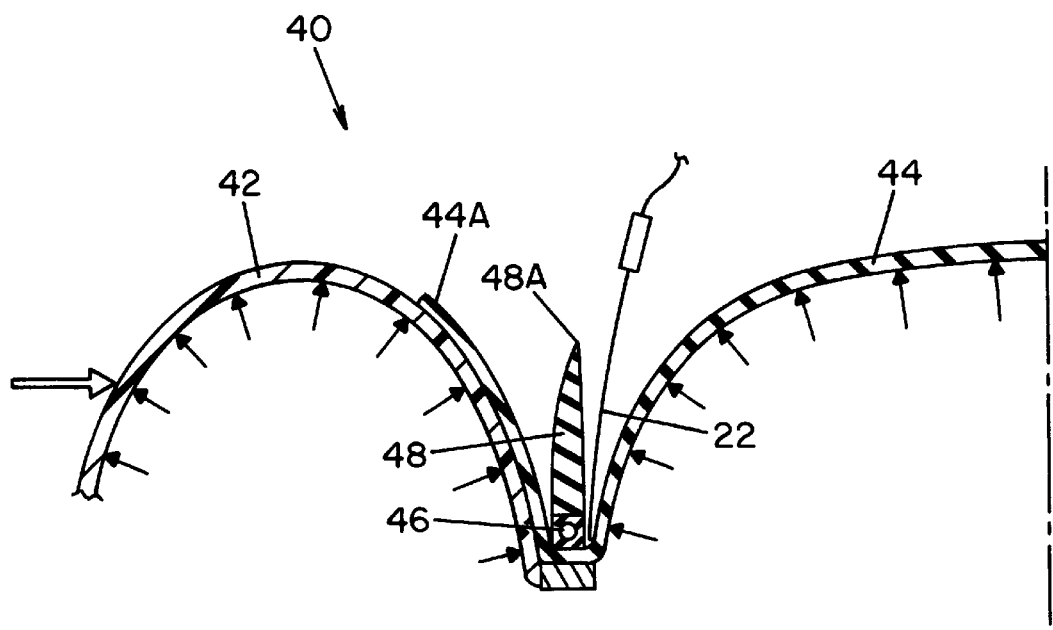
FIG. 4 illustrates a detailed cross-section of the turn-up process wherein the carcass is inflated at the same time a turn-up bladder is inflated.

With reference to FIG. 4, a tire building apparatus wherein the carcass is inflated simultaneously with the inflation of the turn-up bladder is illustrated. Apparatus (40), having turn-up bladder (42) operates on the same principle as the apparatus described in FIGS. 1 and 2 except that carcass (44), as it is inflated, provides the pinching action, with turn-up bladder (42), which causes the turn-up of carcass ply end (44A) over bead (46) and apex (48). Sensor mat (22), although illustrated in FIG. 4 as being between carcass (44) and apex (48), can also be applied between carcass turn-up (44A) and apex (48).

Figure 5:
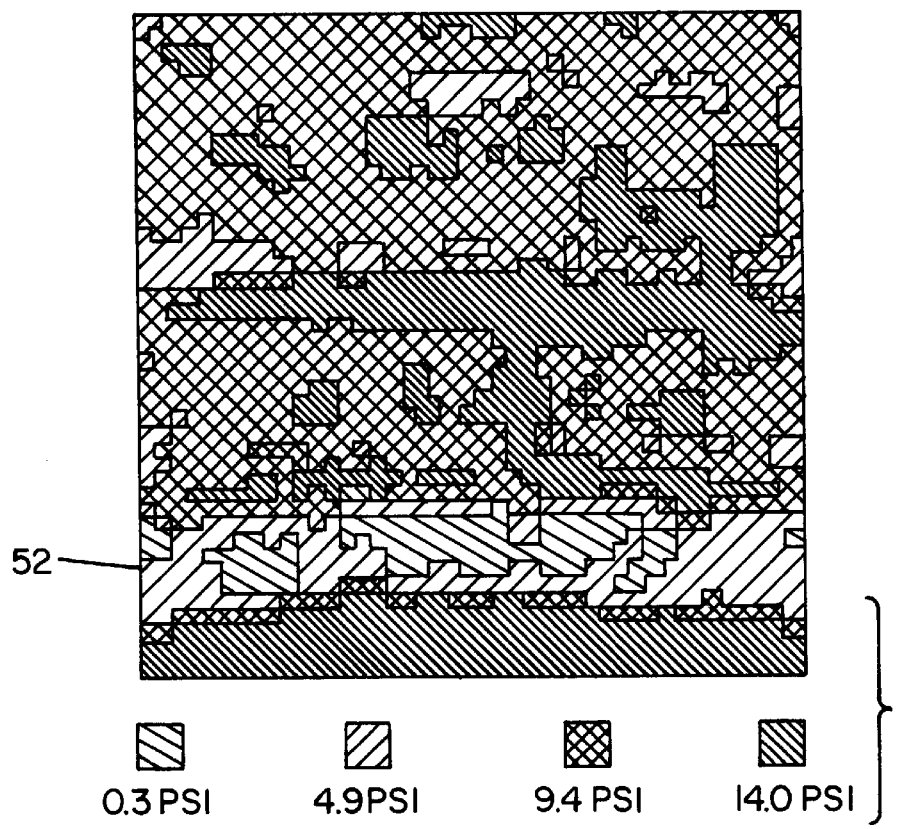
FIG. 5 illustrates the pressure distribution during the turn-up process.

With reference to FIG. 5, results using this equipment show also that there is an area of low-pressure distribution in the region of the apex ending (52). This location is the most prevalent area of low pressure for this type of equipment, and this low-pressure area may cause a green tire to develop apex or sidewall blows when the tire is cured.

In the development of the present invention, applicants obtained data on different apparatus, and have used this data to compare the setups on different machines, and this information, in conjunction with a knowledge of which machines produce scrap and which machines do not produce scrap, can be used to determine the parameters necessary for the most productive and quality use of equipment. The pressure parameters of the apparatus can be modified to provide a more even pressure distribution during a process step that may be in question. Also, detailed knowledge of the sequence of the pressure distribution during the process step makes it possible to adjust the process so that a sequence can be achieved which is not prone to trapping air in different areas of the composite components.

With reference now to FIG. 6, during the testing described above, applicants observed that an off-the-shelf 4"×4" sensor mat suffered wrinkles when being sandwiched between components during the ply turn-up of the tire building process. The wrinkles resulted from the varying curvature of the green carcass surface or along the convex shape of the green carcass. It was observed that the wrinkle lines occurred primarily in the radial direction, and not the circumferential direction of the mat. In order to avoid these wrinkles, the inventors conceived the idea to provide a mat wherein the sensor area is divided into a plurality of narrow strips, to reduce the width of the sensor in the circumferential direction. The smaller sensor increments prevent the mat from compressing upon its self as the area in which it is contained is reduced during the turn-up process. The mat (60) of the invention comprises a sensor area (62) which can be trapezoidal in shape as shown, or rectangular depending on the particular application in which it is used. The sensor portion (62) of mat (60) is connected a handle (64) through a leg (66) which has a length (D1) which is sufficient to provide some flexibility in how the mat is used. Sensor areas (62) and (62A) can have the same or different widths, depending on how the mat is used. Also, the X, Y distribution of the sensors (63) within sensor areas (62, 62A) can be the same in the X direction and in the Y direction, or may be different, also depending on the particular use to which the sensor mat is applied.

As used herein, X, Y distribution of sensors in the sensor mat refers to the geometric distribution of the sensors. For the purposes for which the sensor mat is employed in this invention, the sensor mat has two dimensions, and the placement of a sensor in the X, Y plane on the mat determines the location of the specific pressure point measured by that sensor. The X and Y location of each of the sensors provides a geometric map of the pressure distribution on the mat when the data from all the sensors are displayed.

In one possible application of sensor mat (60), it is contemplated that sensor area (62) can be placed between the apex (48) and carcass (44), and sensor area (62A) can be applied between carcass turn-up (44A) and apex (48), so that pressure measurements on both sides of apex (48) can be obtained. Other applications of this sensor mat will be apparent to those skilled in the art.

The invention is further illustrated with reference to the following examples.

EXAMPLE I

Square 4"×4" sensor mats have been tested on Goodyear production tire building fabrication (GPF) machines, the apparatus shown in FIGS. 1 and 2, during turn-up ends stitching. The results have been noted previously and are shown in FIG. 3. It is clearly shown that the pressure is comparatively lower at the component ends, such as the apex and ply. Study of the GPF machine led to the discovery that the cover plate ending of the machine led to a low-pressure zone.

Since the measurement was also applied during the sidewall stitching, it was observed that the pressure sequence of the stitching, as stitching occurred, could be clearly observed.

EXAMPLE II

This process was also tested on VMI (the apparatus of FIG. 4) machines. VMI is a Dutch machine manufacturer. When using the VMI machines, the apex is pre-assembled on the bead, and the center carcass is inflated at the same time as the turn-up bladder is inflated. The results have been previously noted in FIG. 5, and show that there is a substantial low-pressure area (52) in the composite during the turn-up process. Low-pressure area (52) showed substantially lower pressure than the surrounding areas of the turnup, and comprises a substantially wide area of the composite. This low-pressure area coincides with the apex ending (48A).

The measurements were performed using different pushing cans and turn-up bladders, i.e., 11" diameter bladders and 14" diameter bladders, and different pressure distribution results were seen.

While the invention has been specifically illustrated and described, those skilled in the art will recognize that the invention may be variously modified and practiced without departing from the spirit of the invention. The invention is limited only by the scope of the following claims.

What is claimed is:

1. A method of calibrating pressure distribution applied at a component interface of a composite product by equipment used to fabricate said product, said method comprising the steps of
   (a) inserting a sensor mat adapted to detect pressure at a plurality of X, Y points between fabricating equipment and said composite;
   (b) taking a pressure reading and analyzing the pressure at each point of contact between said equipment and said composite;
   (c) adjusting the equipment to apply different pressures to the composite, if necessary;
   (d) repeating steps (a) and (b) to determine the pressure distribution change caused by adjusting the equipment, if necessary;
   (e) repeating steps (c) and (d) until optimum pressure parameters are achieved.

2. The method of claim 1 which comprises the further step of measuring pressure distribution as a function of time.

3. The method of claim 2 comprising the further steps of determining the pressure sufficient to press air from the composite or at least distribute air in the composite so that it can be vented during curing of the composite.

4. The method of claim 3 wherein step (a) comprises the further step of using said sensor mat between a turn-up bladder and tire components on a tire building machine, and step (b) comprises the further step of collecting data from said sensor in real time on a computer using a program whereby the pressure change can be viewed frame by frame in a time sequence.

5. The method of claim 1 comprising the further step of determining the pressure sufficient to press air from the composite or at least distribute air in the composite so that it can be vented during curing of the composite.

6. A method of fabricating a composite product comprising the steps of
   (a) laying up layered components of said composite;
   (b) calibrating fabricating equipment by
      (i) inserting a sensor mat adapted to detect pressure at a plurality of X, Y points between fabricating equipment and said composite;
      (ii) taking a pressure reading and analyzing the pressure at each point of contact between said equipment and said composite;
      (iii) adjusting the equipment to apply different pressures to the composite, if necessary;
      (iv) repeating steps (a) and (b) to determine the pressure distribution change caused by adjusting the equipment, if necessary;
      (v) repeating steps (c) and (d) until optimum pressure parameters are achieved,
   (c) applying a pressure or pressure sequence to said layered components using said fabricating equipment wherein said pressure or pressure sequence is determined by calibration of the fabricating equipment.

7. The method of claim 6 which comprises the further steps of measuring pressure distribution as a function of time.

8. The method of claim 7 comprising the further steps of determining the pressure sufficient to press air from the composite or at least distribute air in the composite so that it can be vented during curing of the composite.

* * * * *